United States Patent
Konagaya

[11] Patent Number: 6,109,771
[45] Date of Patent: Aug. 29, 2000

[54] LICENSE PLATE LAMP

[75] Inventor: Nobusuke Konagaya, Shizuoka, Japan

[73] Assignee: Koito Manufacturing Co., Ltd., Tokyo, Japan

[21] Appl. No.: 09/033,159

[22] Filed: Mar. 2, 1998

[30]  Foreign Application Priority Data

Mar. 4, 1997 [JP] Japan .................................. 9-048842

[51] Int. Cl.⁷ ..................................................... B60Q 1/56
[52] U.S. Cl. ......................... 362/497; 362/310; 362/311; 362/351; 362/509; 29/563; 384/565
[58] Field of Search ..................... 362/497, 310, 362/311, 351, 509, 84, 169, 222, 223; 29/563; 384/565

[56]  References Cited

U.S. PATENT DOCUMENTS 2,314,151  12/1997  Unno .
4,654,761   3/1987  Walsh ........................................ 362/80
4,868,723   9/1989  Kobayashi ................................ 362/80
5,067,057  11/1991  Stapel ..................................... 362/83.2

FOREIGN PATENT DOCUMENTS

0453887A1   4/1991  European Pat. Off. .
0526336A1   7/1992  European Pat. Off. .
2314151A   12/1997  United Kingdom .

*Primary Examiner*—Sandra O'Shea
*Assistant Examiner*—Bertrand Zeade
*Attorney, Agent, or Firm*—Morgan, Lewis & Bockius LLP

[57]  ABSTRACT

In a lens body, there are provided a plurality of lens groups which are divided in the longitudinal direction of a vehicle body the lens groups are so arranged to be able to illuminate a license display surface substantially uniformly, and when the position relationship between the license plate lamp and license display surfaces varies, the license display surfaces are illuminated respectively by different lens groups each time the position relationship varies.

12 Claims, 7 Drawing Sheets

LICENSE PLATE LAMP

BACKGROUND OF THE INVENTION

The present invention relates to a novel license plate lamp and, in particular, to a technique in which, even if a license plate lamp is mounted on different vehicle bodies, the license display surface of the license plate lamp can be illuminated substantially uniformly.

Conventionally, a license plate lamp comprises a light source body including a light emitting part, a lens body including a group of lenses, and a lamp body, and is to be mounted on the neighboring portion of the license display surface of a license plate which is installed to the rear end portion of a vehicle body. And, in this license plate lamp, the light that is radiated directly from the light emitting part (which is hereinafter referred to as "direct light") is controlled by the lens group to thereby form a light flux for illumination (which is hereinafter referred to as "illumination light flux"), while the license display surface is illuminated by the thus formed illumination light flux in such a manner that an illumination ratio of the brightest spot to the darkest spot should be confined to or less than 20 to 1, that is, in the range of a so called safety reference value or less.

By the way, in a conventional license plate lamp, there is prepared only one position relationship between the lens group and the license display surface that allows the license display surface to be illuminated by the illumination light flux controlled by the lens group.

Therefore, in the above-mentioned conventional license plate lamp, if the vehicle body to which the license plate lamp is to be mounted is changed to another and the position relationship between the lens group and the license display surface is thereby changed, then the illumination light flux controlled by the lens group is displaced from the license display surface, which makes it impossible that the license display surface is illuminated by the illumination light flux. Due to this, the license plate lamp cannot be used as a part which can be used in common among different vehicle bodies and thus different license plate lamps must be prepared for the respective different vehicle bodies.

SUMMARY OF THE INVENTION

In view of the above conventional license plate lamp, it is an object of the invention to provide a license plate lamp which can be used in common among different vehicle bodies.

In attaining the above object, according to the invention, there is provided a license plate lamp structured such that there are provided in a lens body a plurality of lens groups which are divided in the longitudinal direction of a vehicle body, the respective lens groups are so arranged as to be able to illuminate the license display surface substantially uniformly, and, when the mutual position relationships between the license plate lamp and license display surfaces are different from one another, the different license display surfaces can be illuminated by different lens groups each time the position relationship differs.

Due to the above structure, according to the license plate lamp of the invention, even when the vehicle body to which the license plate lamp is to be mounted is changed to another and the position relationship between the lens group and the license display surface is thereby changed, if the license display surface can be illuminated by the light flux that is controlled by the other lens groups, then the present license plate lamp can be used, so that the present license plate lamp can be used in common among different vehicle bodies.

DESCRIPTION OF THE PREFERRED EMBODIMENTS

Figure 1:
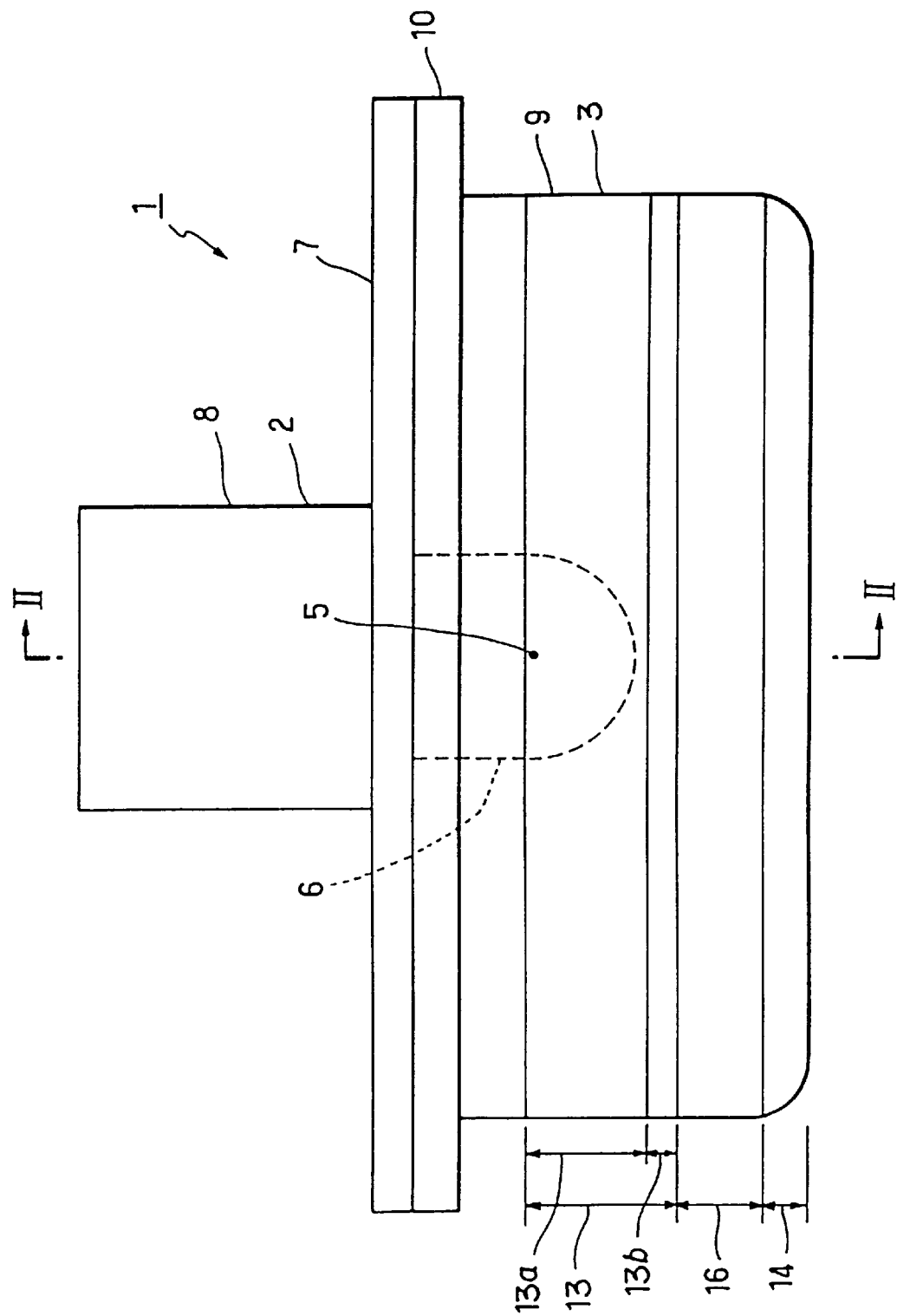
FIG. 1 is a front view of a first embodiment of a license plate lamp according to the invention.

Now, description will be given below in detail of the embodiments of a license plate lamp according to the invention with reference to the accompanying drawings.

Here, FIGS. 1 to 5 respectively show a first embodiment of a license plate lamp according to the invention.

In particular, a license plate lamp 1 comprises a lamp body 2, a lens body 3, and a light source body 8 including a light emitting part 5 in a lamp chamber 4 defined by the lamp body 2 and lens body 3.

The lamp body 2 includes a substantially plate-shaped main portion 7, and a light source body 8 which projects upwardly from the central portion of the main portion 7. The main portion 7 and light source body 8 are formed of synthetic resin or the like into an integral body.

The lens body 3 includes a main portion 9 which is formed in a bowl-like shape and is open upwardly, and a flange 10 which projects outwardly from the upper edge of the main portion 9. The main portion 9 and flange 10 are formed of transparent material such as transparent synthetic resin into an integral body.

Figure 2:
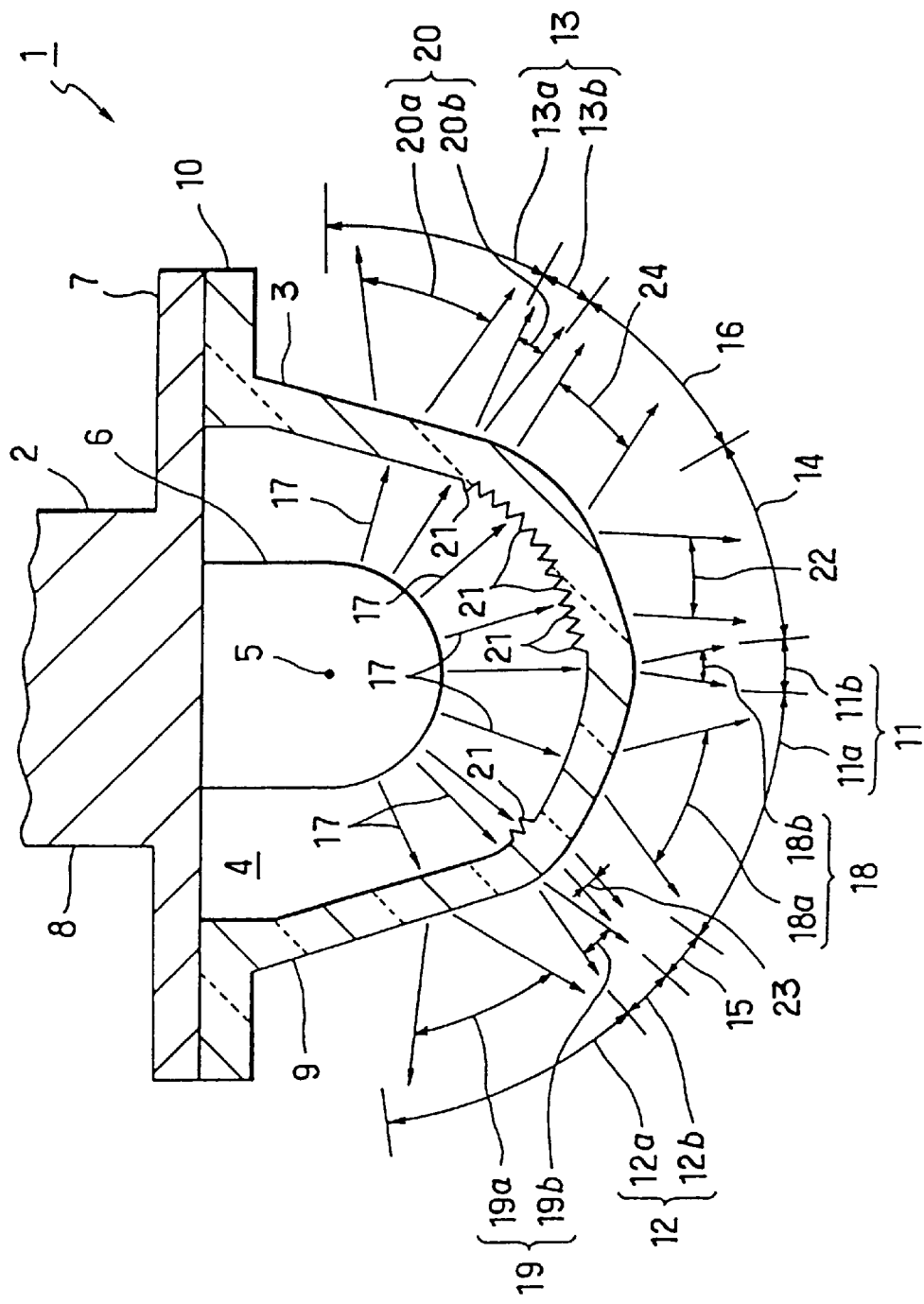
FIG. 2 is a section view taken along the line II—II shown in FIG. 1.

In the main portion 9 of the lens body 3, there are formed lens groups 11, 12 and 13 which are respectively used to illuminate the license display surface of the license plate to be discussed later as well as complementary lens areas 14, 15 and 16 which are used to complement their respective lens groups 11, 12 and 13 in such a manner that they respectively extend in the right and left directions (in particular, a direction going to the right in FIG. 1 is set as the right direction, a direction going to the left in FIG. 1 is set as the left direction, a direction going to the right in FIG. 2 is set as the forward direction, and a direction going to the left in FIG. 2 is set as the backward direction).

The lens groups 11, 12 and 13 respectively include areas 11a, 12a and 13a having minute uneven portions each of a large diffusion angle, and areas 11b, 12b and 13b having minute uneven portions each of a small diffusion angle, while respective direct lights respectively sent from the light emitting part 5 are diffused by these areas 11a, 12a, 13a and 11b, 12b, 13b to thereby form illumination light fluxes 18, 19 and 20.

The complementary lens areas 14, 15 and 16 are disposed on the inner surface of the main portion 9 of the lens main body 3 at the positions thereof respectively adjacent to the areas 11b, 12b and 13b having minute uneven portions each of a small diffusion angle, and also the complementary lens areas 14, 15 and 16 respectively have a large number of lens steps 21.

The lens steps 21 are projectingly provided on the inner surface of the lens body 3 so as to form complementary light flux 22, 23 and 24 which are used to refract the direct lights 17 to thereby complement the same in such a manner that a difference between the brightest and darkest points of the illumination light fluxes 18, 19 and 20 can be reduced.

By the way, the arrangement directions of the areas 13a and 13b of the lens group 13 respectively having large and small diffusion angle minute uneven portions are reversed in the back and forth directions when compared with the arrangement directions (see FIG. 2) of the areas 11a, 12a and 11b, 12b of the other lens groups 11 and 12 respectively having large and small diffusion angle minute uneven portions. The reason for this is to use the license plate lamp 1 in such a manner that the front and rear portions thereof can be reversed from the state thereof shown in FIG. 2. This makes it possible to use substantially the whole surface of the lens body 3. Also, if the two front and rear sides of the lens body 3 can be used in this manner, then even such lens groups that cannot be disposed on the same side (because, if they are disposed on the same side, then they are overlapped in part with each other), such as lens groups 12 and 13, can be disposed on the lens body 3 without being overlapped.

Figure 3:
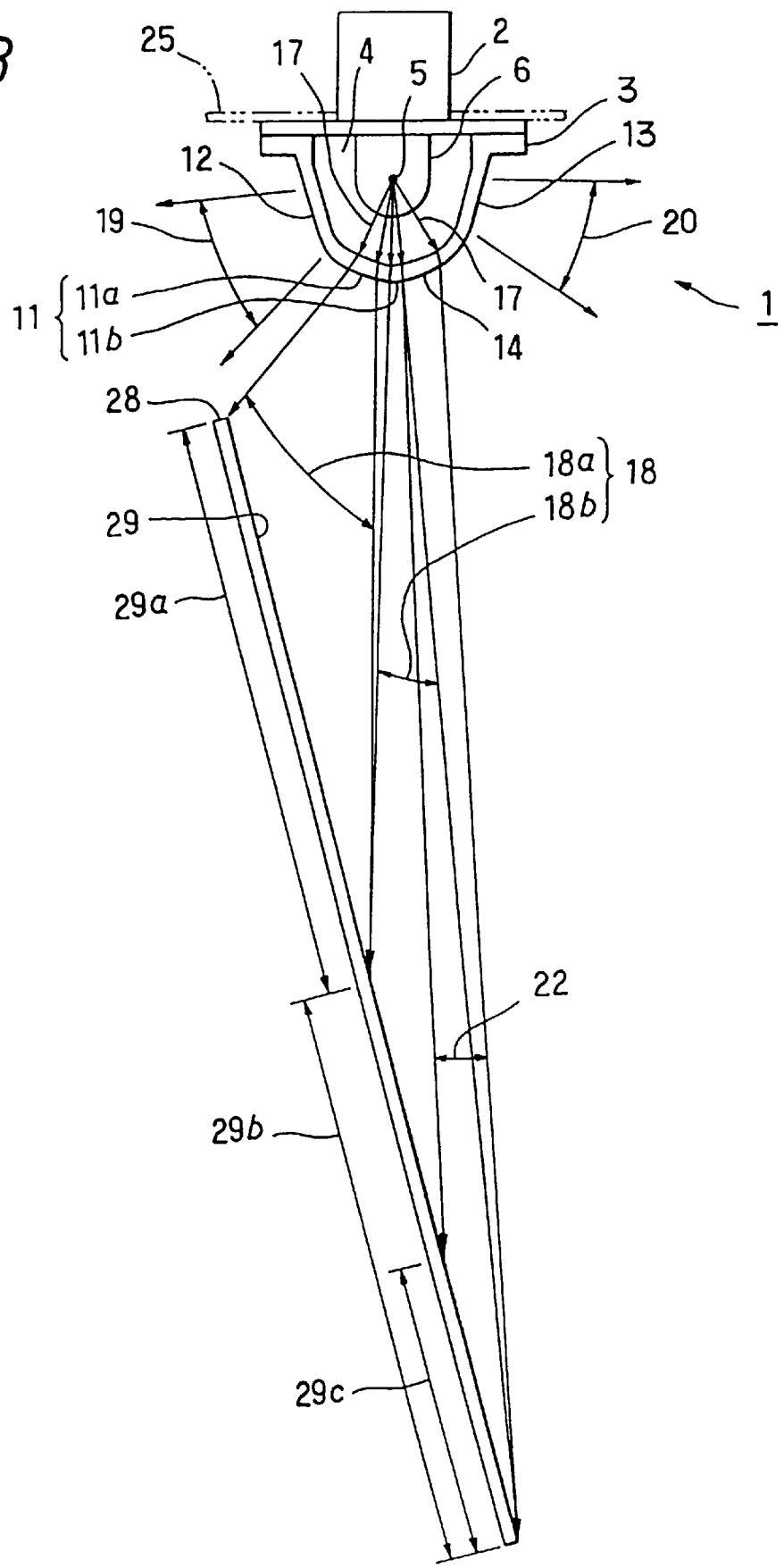
FIG. 3 is a section view of the license plate lamp shown in FIG. 1, showing a state thereof in which it is mounted on a vehicle body.

The license plate lamp 1, which is arranged in a vehicle body 25 in such a state as shown in FIG. 3, is structured such that it is able to illuminate the license display surface 29 of a license plate by means of the illumination light flux 18 that is controlled by the lens group 11 and by means of the complementary illumination light flux 22 that is controlled by the complementary lens area 14.

And, a light flux 18a, which is obtained when the direct lights 17 are diffused greatly by the area 11a having a large diffusion angle uneven portion, is used to illuminate the upper half section 29a of the license display surface 29 in the vertical direction thereof, whereas a light flux 18b, which is obtained when the direct lights 17 are diffused lightly by the area 11b having a small diffusion angle uneven portion, is used to illuminate the lower half section 29b of the license display surface 29 in the vertical direction thereof.

Also, the lens steps 21 of the complementary lens area 14 refract the direct lights 17 of the light emitting part 5 to thereby form the complementary flux 22, while the thus formed complementary flux 22 illuminates a substantially quarter portion 29c of the lower end portion of the license display surface 29 in the vertical direction thereof.

Therefore, in the license plate lamp 1 arranged in such a manner as shown in FIG. 3, not only the license display surface 29 is illuminated by the illumination light flux 18 controlled in such a manner that the light used to illuminate the portion of the license display surface located near the light emitting part 5 can be fairly weakened while the light to illuminate the portion of the license display surface located remotely from the light emitting part 5 can be fairly weakened, but also the substantially quarter portion 29c of the lower end portion of the license display surface 29 in the vertical direction thereof, which is located most remotely from the light emitting part 5, is illuminated by the complementary light flux 22, so that the license display surface 29 can be illuminated with further uniform brightness.

Figure 4:
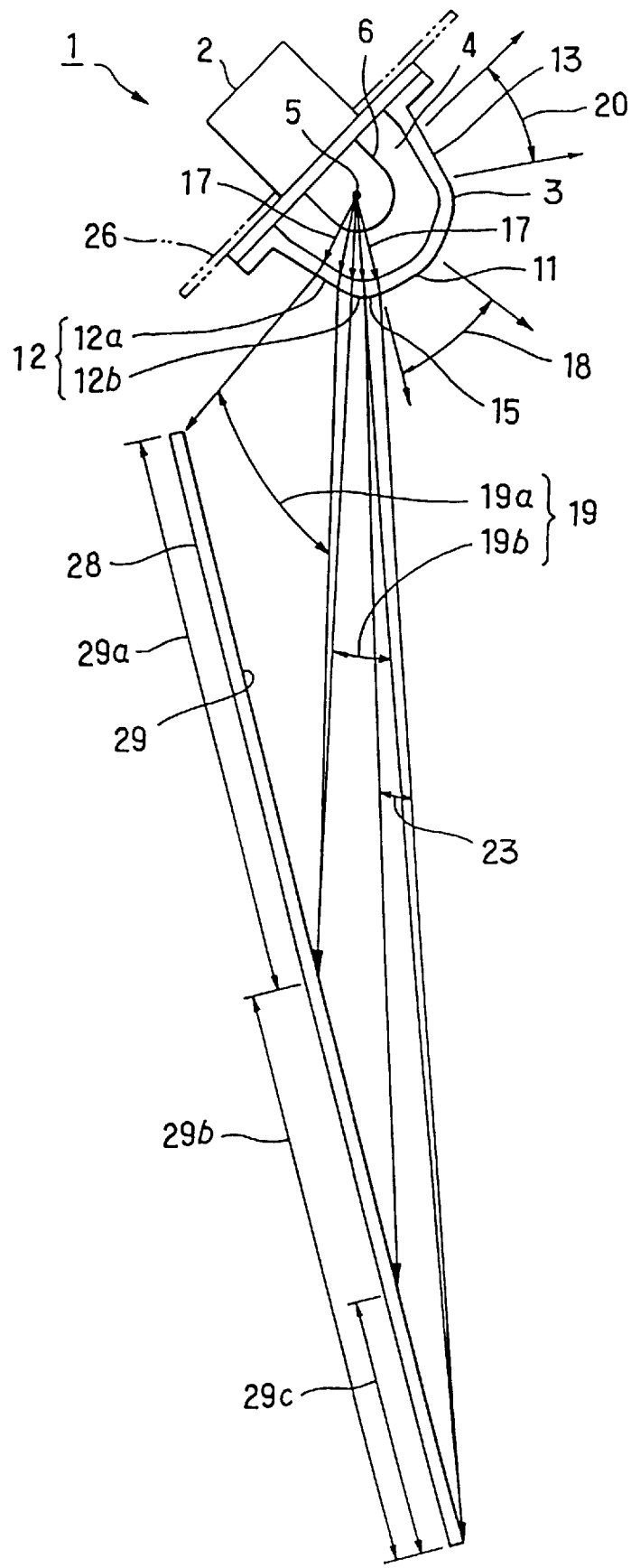
FIG. 4 is a section view of the license plate lamp shown in FIG. 1, showing a state thereof in which it is mounted on a vehicle body different from the vehicle body shown in FIG. 3.

Now, the license plate lamp 1, which is arranged in the vehicle body 26 in such a state as shown in FIG. 4, is structured such that it illuminates the license display surface 29 by means of the illumination light flux 19 controlled by the lens group 12 and the complementary light flux 23 controlled by the complementary lens area 15.

And, a light flux 19a, which is obtained when the direct lights 17 are diffused greatly by the area 12a having a large diffusion angle uneven portion, is used to illuminate the upper half section 29a of the license display surface 29 in the vertical direction thereof, whereas a light flux 19b, which is obtained when the direct lights 17 are diffused lightly by the area 12b having a small diffusion angle uneven portion, is used to illuminate the lower half section 29b of the license display surface 29 in the vertical direction thereof.

Also, the lens steps 21 of the complementary lens area 15 refract the direct lights 17 of the light emitting part 5 to thereby form the complementary flux 23, while the thus formed complementary flux 23 illuminates a substantially quarter portion 29c of the lower end portion of the license display surface 29 in the vertical direction thereof.

Therefore, in the license plate lamp 1 arranged in such a manner as shown in FIG. 4, not only the license display surface 29 is illuminated by the illumination light flux 19 controlled in such a manner that the light used to illuminate the portion of the license display surface located near the light emitting part 5 can be fairly weakened while the light to illuminate the portion of the license display surface located remotely from the light emitting part 5 can be fairly weakened, but also the substantially quarter portion 29c of the lower end portion of the license display surface 29 in the vertical direction thereof, which is situated most remotely from the light emitting part 5, is illuminated by the complementary light flux 23, so that the license display surface 29 can be illuminated with further uniform brightness.

Figure 5:
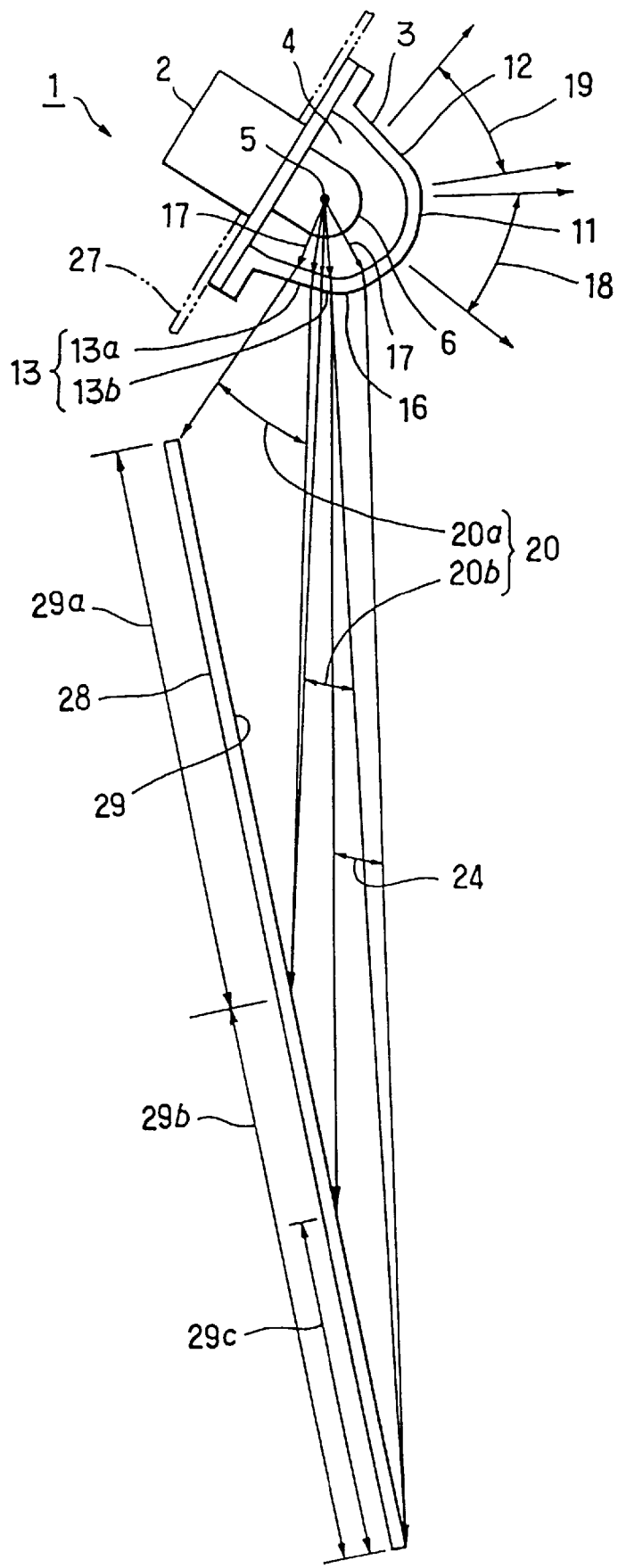
FIG. 5 is a section view of the license plate lamp shown in FIG. 1, showing a state thereof in which it is mounted on a vehicle body different from the vehicle bodies shown in FIGS. 3 and 4.

Now, the license plate lamp 1, which is arranged in the vehicle body 27 in such a state as shown in FIG. 5, is structured such that it illuminates the license display surface 29 by means of the illumination light flux 20 controlled by the lens group 13 and the complementary light flux 24 controlled by the complementary lens area 16. By the way, the license plate lamp 1 shown in FIG. 5 can be obtained by reversing the front and back portions of the license plate lamp 1 shown in FIG. 4 so that the lens group 13 faces toward the license display surface 29 side.

And, a light flux 20a, which is obtained when the direct lights 17 are diffused greatly by the area 13a having a large diffusion angle minute uneven portion, is used to illuminate the upper half section 29a of the license display surface 29 in the vertical direction thereof, whereas a light flux 20b, which is obtained when the direct lights 17 are diffused lightly by the area 13b having a small diffusion angle minute uneven portion, is used to illuminate the lower half section 29b of the license display surface 29 in the vertical direction thereof.

Also, the lens steps 21 of the complementary lens area 16 refract the direct lights 17 of the light emitting part 5 to thereby form the complementary flux 24, while the thus formed complementary flux 24 illuminates a substantially quarter portion 29c of the lower end portion of the license display surface 29 in the vertical direction thereof.

Therefore, in the license plate lamp 1 arranged in such a manner as shown in FIG. 5, not only the license display surface 29 is illuminated by the illumination light flux 20 controlled in such a manner that the light used to illuminate the portion of the license display surface located near the light emitting part 5 can be fairly weakened, whereas the light to illuminate the portion of the license display surface located remotely from the light emitting part 5 cannot be weakened so much, but also the substantially quarter portion 29*c* of the lower end portion of the license display surface 29 in the vertical direction thereof, which is located most remotely from the light emitting part 5, is illuminated by the complementary light flux 24, with the result that the license display surface 29 can be illuminated with further uniform brightness.

Accordingly, in the present first embodiment, as described above, since the lens body 3 includes the three lens groups 11, 12 and 13, as the position relationship between the license plate lamp 1 and license display surface 29 that allows the illumination light flux to illuminate the license display surface 29, there are provided such three kinds of position relationship as shown in FIGS. 3 to 5.

Therefore, even when the vehicle bodies on which the license plate lamp 1 is to be mounted are different and the position relationship between the lens groups 11, 12 and 13 and the license display surface 29 are thereby changed, the license display surface 29 can be illuminated by one of the illumination light fluxes 18, 19 and 20 respectively controlled by their respective lens groups 11, 12 and 13. Thanks to this, the license plate lamp 1 can be used in common among the vehicle bodies 25, 26 and 27.

By the way, in the foregoing description of the above-mentioned license plate lamp 1, the lens groups 11, 12 and 13 respectively include two kinds of areas 11*a*, 12*a*, 13*a* each having a large diffusion angle minute uneven portion, and areas 11*b*, 12*b*, 13*b* each having a small diffusion angle minute uneven portion. However, this is not limitative but, for example, the diffusion angle can also be so set as to vary gradually from the area having a large diffusion angle minute uneven portion toward the area having a small diffusion angle minute uneven portion.

Also, the complementary lens areas 14, 15 and 16 are the portions which are situated remotely from the light emitting part 5 of the license display surface 29 and are used to lighten the portions that are apt to become dark, thereby reducing the difference between the light and darkness of the whole license display surface 29. That is, according to the present embodiment, instead of providing the complementary lens areas 14, 15 and 16, the number of lens groups may be increased.

Figure 6:
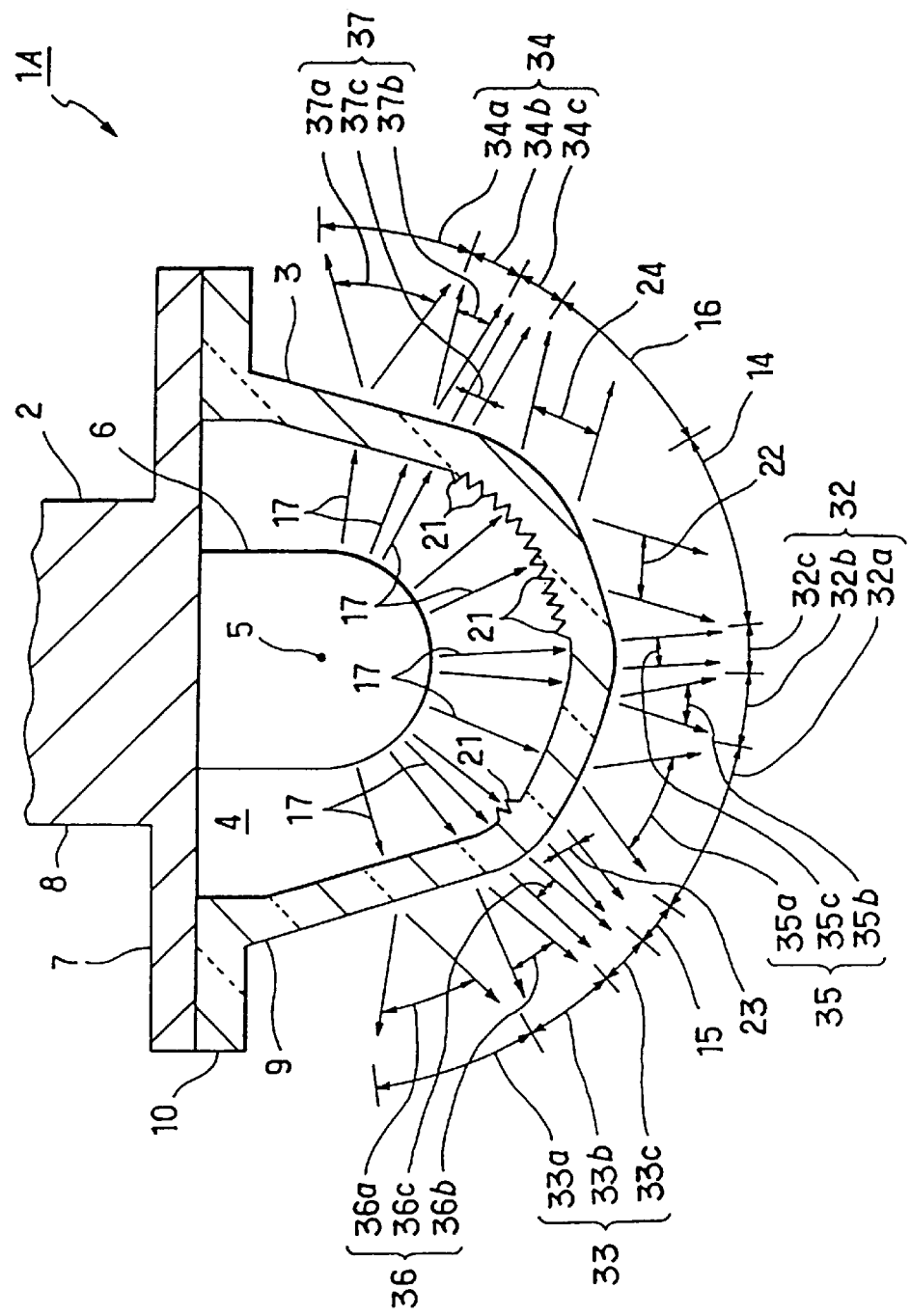
FIG. 6 is a longitudinal section view of a second embodiment of a license plate lamp according to the invention; and, FIG. 7 is a section view of the license plate lamp shown in FIG. 6, showing a state thereof in which it is mounted on a vehicle body.
Figure 7:
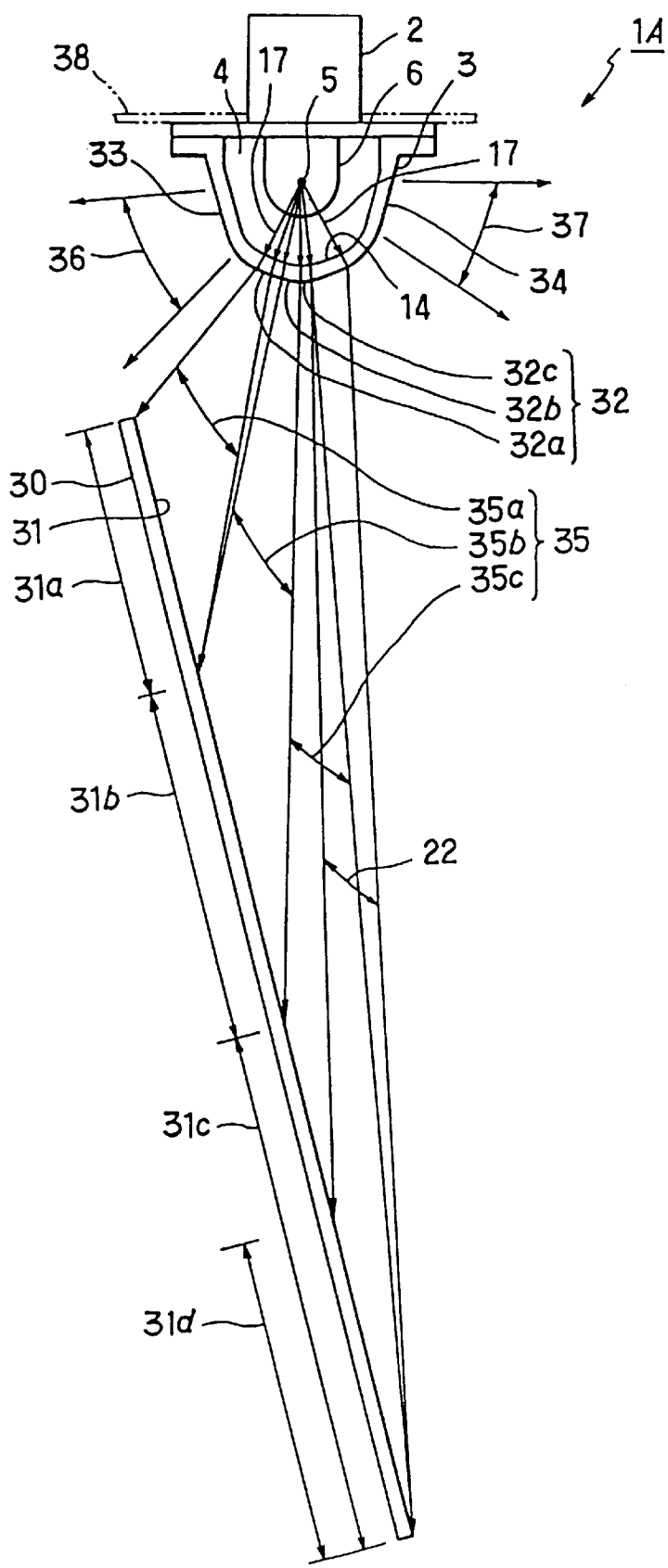

Now, FIGS. 6 and 7 respectively show a second embodiment of a license plate lamp according to the invention. The second embodiment is different from the previously described first embodiment only in the structure of the lens groups. Therefore, in the second embodiment, description will be given below mainly of the portions thereof that are different from the first embodiment, whereas the remaining portions of the second embodiment are given the same designations as in the corresponding portions of the first embodiment and thus most description thereof is omitted here.

In particular, a license plate lamp 1A includes three lens groups 32, 33 and 34 for controlling the direct lights 17 of the light emitting part 5 so that it can illuminate the license display surface 31 of a license plate 30 uniformly.

The lens groups 32, 33 and 34 respectively include areas 32*a*, 33*a*, 34*a* each having a large diffusion angle minute uneven portion, areas 32*b*, 33*b*, 34*b* each having a small diffusion angle minute uneven portion, and blank areas 32*c*, 33*c*, 34*c* each having no minute uneven portion, while the three lens groups 32, 33 and 34 are respectively used to control the direct lights 17 coming from the light emitting part 5 to thereby form illumination light fluxes 35, 36 and 37.

Firstly, description will be given below of the license plate lamp 1A which is arranged on a vehicle body 38 in such a manner as shown in FIG. 7. That is, the license plate lamp 1A is used to illuminate a license display surface 31 by means of an illumination light flux 35 controlled by the lens group 32 and a complementary light flux 22 controlled by the complementary lens area 14: in particular, a light flux 35*a*, which is obtained when the area 32*a* having a large diffusion angle minute uneven portion diffuses the direct lights 17 to a great extent, illuminates substantially a third portion or the upper end portion 31*a* of the license display surface 31 in the vertical direction thereof; a light flux 35*b*, which is obtained when the area 32*b* having a small diffusion angle minute uneven portion diffuses the direct lights 17 to a small extent, illuminates substantially the central portion 31*b* of the license display surface 31; and, a light flux 35*c*, which is obtained when the direct lights 17 pass through the blank area 32*c*, illuminates substantially a third portion or the lower end portion 31*b* of the license display surface 31 in the vertical direction thereof.

And, a complementary light flux 22 controlled by the complementary lens area 14 illuminates substantially a quarter portion or the lower end portion 31*d* of the license display surface 31 that is located most remotely from the light emitting part 5.

Therefore, in the license plate lamp 1A which is arranged in such a manner as shown in FIG. 7, the direct lights 17 emitted from the light emitting part 5 are controlled by the lens group 32 to thereby form an illumination light flux 35 in such a manner that the light to illuminate the portion of the license display surface 31 located near the light emitting part 5 is fairly weakened whereas the light to illuminate the portion of the license display surface 31 located remotely from the light emitting part 5 is not weakened so much; and, the thus formed illumination light flux 35 is used to illuminate the license display surface 31, while the substantially quarter portion or the lower end portion 31*d* of the license display surface 31 in the vertical direction thereof, which is located most remotely from the light emitting part 5, is illuminated by the complementary light flux 22, with the result that the license display surface 31 can be illuminated with further uniform brightness.

Also, the lens groups 33 and 34 can be used for illumination after the license plate lamp 1A is mounted onto the vehicle body in such position relationship as shown in FIGS. 4 and 5 with respect to the license display surface 31, which figures have been previously discussed in the first embodiment; that is, they can be used simply by applying the illumination method shown in FIG. 7 to the states shown in FIGS. 4 and 5. For this reason, detailed description and illustration of the lens groups 33 and 34 are omitted here.

Accordingly, in the present second embodiment, since the lens body 3 includes the three lens groups 32, 33 and 34, the number of directions to be taken by the lens body 3 with respect to the license display surface 31, which can used to illuminate the license display surface 31 substantially uniformly, is three which is equal to the number of lens groups 32, 33 and 34.

Therefore, even when the vehicle bodies on which the license plate lamp 1A is to be mounted vary and the position relationship between the license plate lamp 1A and license display surface 31 is thereby changed, the license display surface 31 can be illuminated by one of the illumination light fluxes 35, 36 and 37 respectively controlled by the lens groups 32, 33 and 34. Thanks to this, the license plate lamp 1A can be used in common among the different vehicle bodies.

As can be seen clearly from the foregoing description, the license plate lamp according to the invention comprises a light source body including a light emitting part, a transparent lens body, and a lamp body, and is used to illuminate a license display surface by disposing the light emitting part in the neighborhood of the peripheral edge portion thereof on the license display surface side, in which there are provided in the lens body a plurality of lens groups divided in the longitudinal direction of a vehicle body, the lens groups are respectively so arranged as to be able to illuminate the license display surface substantially uniformly, and, when the position relationship between the license plate lamp and license display surfaces varies, the license display surfaces can be illuminated respectively by different lens groups each time the position relationship varies. Thanks to this, even when the position relationship between the lens groups and license display surface is changed because the vehicle body on which the license plate lamp is to be mounted is changed, if the license display surface can be illuminated by the light flux that is controlled by any one of other lens groups provided in the present license plate lamp, then the present license plate lamp can be used. That is, the present license plate lamp can be used in common among the different vehicle bodies.

Also, according to the invention, in a license plate lamp, the lens groups respectively include a plurality of lens areas which are divided in the longitudinal direction of the vehicle body and also which have different diffusion angles, and, at least in one of the lens groups, the back-and-forth arrangement directions of the lens areas are reversed with respect to the arrangement directions of the lens areas in the remaining lens areas. Due to this, the license plate lamp can be used in such a manner that the front and rear sides thereof can be reversed, which in turn makes it possible to use substantially the whole surface of the lens body effectively. Also, the front and rear sides of the lens body can be used similarly. Thanks to this, a plurality of lens groups which, if they are provided on the same side, overlap in part with one another, are allowed to coexist in one lens body without overlapping with each other.

Further, according to another aspect of the invention, in a license plate lamp, diffusion means provided in each of the lens areas is a minute uneven portion formed in the lens surface of the lens. Due to this, the lens groups can be formed in a simple manner.

Still further, according to another aspect of the invention, in a license plate lamp, each of the lens groups includes at least one area having the minute uneven portion and a blank area having no minute uneven portion. This makes it possible to reduce a difference between the light and dark portions of the license display surface when it is illuminated.

In addition, according to still another aspect of the invention, in a license plate lamp, there is provided a complementary lens area which, when the license display surface is illuminated by one of the lens groups, refracts part of the light not passing through the present lens group to thereby illuminate the portions of the license display surface that are located remotely from the light emitting part. Thanks to this, the portions of the license display surface, which are apt to be dark when the license displace surface is illuminated because they are located remotely from the light emitting part, can be brightened, which makes it possible to illuminate the license display surface further uniformly.

By the way, the concrete shapes and structures of the respective parts shown in the above-mentioned embodiments of the invention are just examples when enforcing the present invention and, therefore, the technological scope of the invention should not be limited to them.

What is claimed is:

1. A license plate lamp for attachment to a vehicle body, comprising:
    a lamp body;
    a transparent lens body coupled to the lamp body, wherein the transparent lens body includes a plurality of lens groups divided in a longitudinal direction of the vehicle body; and
    a light source body disposed in the lamp body for illuminating a display surface of a license plate, wherein the light source body includes a light emitting part.

2. A license plate lamp as set forth in claim 1, wherein each of the plurality of lens groups comprises a plurality of lens areas divided in the longitudinal direction of the vehicle body,
    wherein the plurality of lens areas have different diffusion angles within each lens group, and
    wherein at least in one of the plurality of lens groups, back-and-forth arrangement directions of the lens areas are reversed with respect to arrangement directions of the lens areas of the remaining plurality of lens groups.

3. A license plate lamp as set forth in claim 2, wherein the diffusion angles are formed by diffusion means provided in each of the plurality of lens areas, and
    wherein the diffusion means comprises a minute uneven portion formed on a surface of the lens area.

4. A license plate lamp as set forth in claim 1 or 2, wherein each of the plurality of lens groups includes at least one lens area having the minute uneven portion and a lens area having a blank area where there is no minute uneven portion.

5. A license plate lamp as set forth in claim 1, further comprising a complementary lens area for illuminating the portions of the display surface of the license plate that are located remotely from the light emitting part, wherein the complementary lens area refracts part of the light not passing through the plurality of lens groups when the display surface of the license plate is illuminated by the plurality of lens groups.

6. A license plate lamp as set forth in claim 1, wherein each of the plurality of lens groups comprises a plurality of lens areas and the plurality of lens areas within each lens group have different diffusion angles.

7. A license plate lamp as set forth in claim 6, wherein the diffusion angles are arranged to substantially illuminate the entire display surface of the license plate.

8. A license plate lamp as set forth in claim 6, wherein the transparent lens body has at least one lens group having lens areas with first a large, and then a small diffusion angle, and at least one lens group having lens areas with first a small, and then a large diffusion angle.

9. A license plate lamp for attachment to a vehicle body, comprising:
    a lamp body;
    a transparent lens body coupled to the lamp body, wherein the transparent lens body includes a plurality of lens groups;
    a light source body disposed in the lamp body for illuminating a display surface of a license plate, wherein the light source body includes a light-emitting part, each of the plurality of lens groups comprises a plurality of lens areas, and each of the plurality of lens areas has a different diffusion angle;

wherein the transparent lens body has at least one lens group having lens areas with first a large, and then a small diffusion angle, and at least one lens group having lens areas with first a small, and then a large diffusion angle.

10. A license plate lamp according to claim 9, wherein the diffusion angles are formed by diffusion means provided in each of the plurality of lens areas, and wherein the diffusion means comprises a minute uneven portion formed on a surface of the lens area.

11. A license plate lamp according to claim 9, wherein each of the plurality of lens groups includes at least one lens area having the minute uneven portion and a lens area having a blank area where there is no minute uneven portion.

12. A license plate lamp according to claim 9, further comprising a complementary lens area for illuminating the portions of the display surface of the license plate that are located remotely from the light emitting part, wherein the complementary lens area refracts part of the light not passing through the plurality of lens groups when the display surface of the license plate is illuminated by the plurality of lens groups.

* * * * *